United States Patent
Yim et al.

(10) Patent No.: US 8,186,469 B2
(45) Date of Patent: May 29, 2012

(54) MOBILE ROBOT

(75) Inventors: Choong-hyuk Yim, Seoul (KR); Dong-hwan Kim, Seoul (KR)

(73) Assignee: Convex Co., Ltd., Seoul (KR)

( * ) Notice: Subject to any disclaimer, the term of this patent is extended or adjusted under 35 U.S.C. 154(b) by 108 days.

(21) Appl. No.: 12/680,392

(22) PCT Filed: Sep. 28, 2007

(86) PCT No.: PCT/KR2007/004771
§ 371 (c)(1),
(2), (4) Date: Mar. 26, 2010

(87) PCT Pub. No.: WO2009/041746
PCT Pub. Date: Apr. 2, 2009

(65) Prior Publication Data
US 2010/0243357 A1 Sep. 30, 2010

(30) Foreign Application Priority Data
Sep. 27, 2007 (KR) .................. 10-2007-0097188

(51) Int. Cl.
*B62D 11/00* (2006.01)
(52) U.S. Cl. ......... 180/218; 180/6.2; 180/6.28; 180/8.3; 280/5.2; 901/1
(58) Field of Classification Search ............ 180/6.2, 180/6.28, 6.48, 6.5, 8.1, 8.2, 8.3, 218; 280/5.2, 280/5.3, 5.32; 901/1
See application file for complete search history.

(56) References Cited

U.S. PATENT DOCUMENTS

| | | | |
|---|---|---|---|
| 4,236,343 A | 12/1980 | Wildman | |
| 4,648,853 A * | 3/1987 | Siegfried | 446/448 |
| 6,066,026 A * | 5/2000 | Bart et al. | 446/460 |
| 6,502,657 B2 * | 1/2003 | Kerrebrock et al. | 180/218 |
| 6,548,982 B1 | 4/2003 | Papanikolopoulos et al. | |
| 6,860,346 B2 * | 3/2005 | Burt et al. | 180/8.2 |
| 7,056,185 B1 * | 6/2006 | Anagnostou | 446/456 |
| 7,559,385 B1 * | 7/2009 | Burt et al. | 180/65.1 |
| 7,766,719 B2 * | 8/2010 | Ishihara et al. | 446/409 |
| 7,794,300 B2 * | 9/2010 | Moll et al. | 446/164 |
| 7,891,447 B2 * | 2/2011 | Carlson et al. | 180/9.44 |
| 7,926,598 B2 * | 4/2011 | Rudakevych | 180/9.32 |

FOREIGN PATENT DOCUMENTS

| | | |
|---|---|---|
| JP | 62-039377 A | 2/1987 |
| KR | 2007-0067928 A | 6/2007 |

* cited by examiner

*Primary Examiner* — Tony H. Winner
*Assistant Examiner* — Marc Scharich
(74) *Attorney, Agent, or Firm* — Rabin & Berdo, PC

(57) ABSTRACT

The present invention relates to a mobile robot having jump function. An exemplary mobile robot according to an embodiment of the present invention includes a robot body, a pair of wheels, a driving motor, a leaf spring, and a leaf spring control unit. The pair of wheels are rotatably connected to the robot body. The driving motor drives the pair of wheels so as to move the robot body. The leaf spring has a fixed end fixedly connected to the robot body and a free end disposed to face the fixed end in a state of being apart from the robot body. The leaf spring control unit applies force for bending the leaf spring such that the free end of the leaf spring is pulled toward the robot body and then removes the force applied to the leaf spring such that the leaf spring returns to an original state.

5 Claims, 5 Drawing Sheets

[Fig. 3]
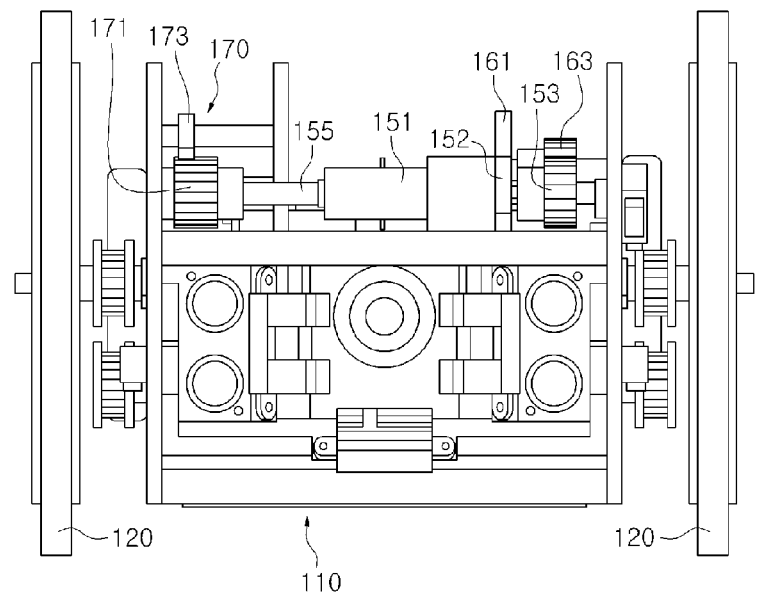
[Fig. 4]
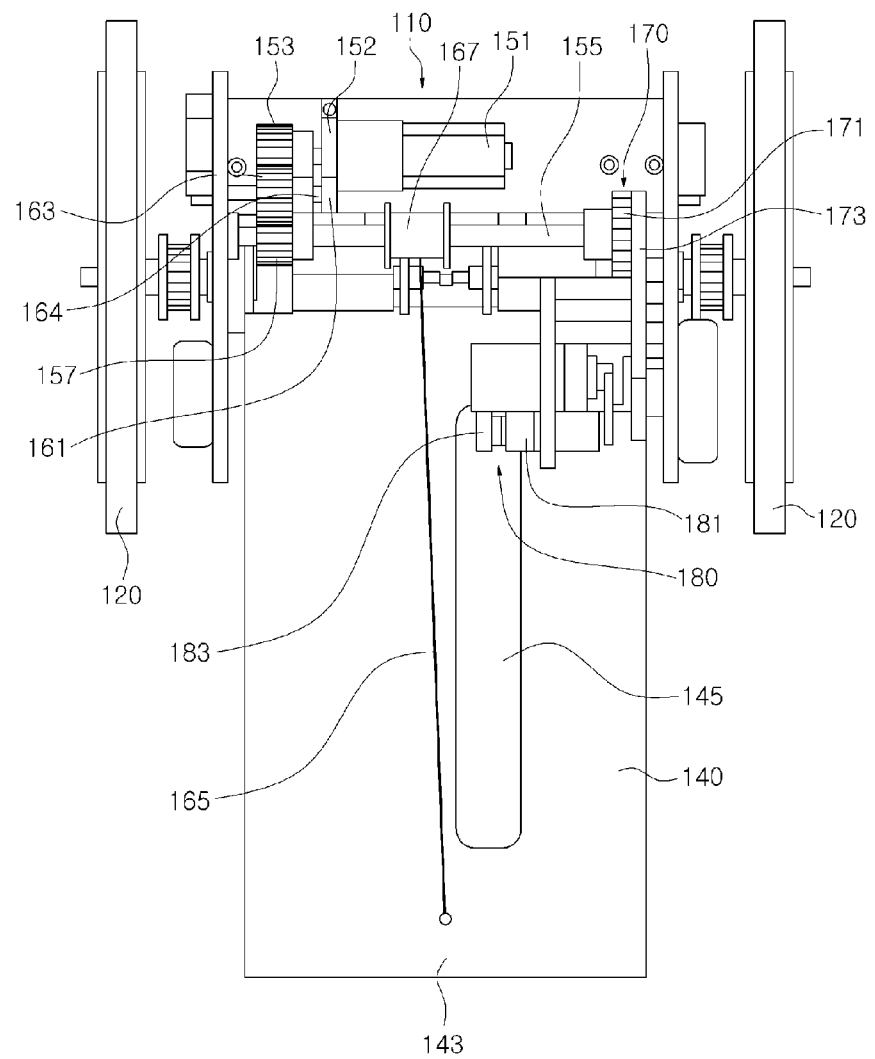

[Fig. 5]
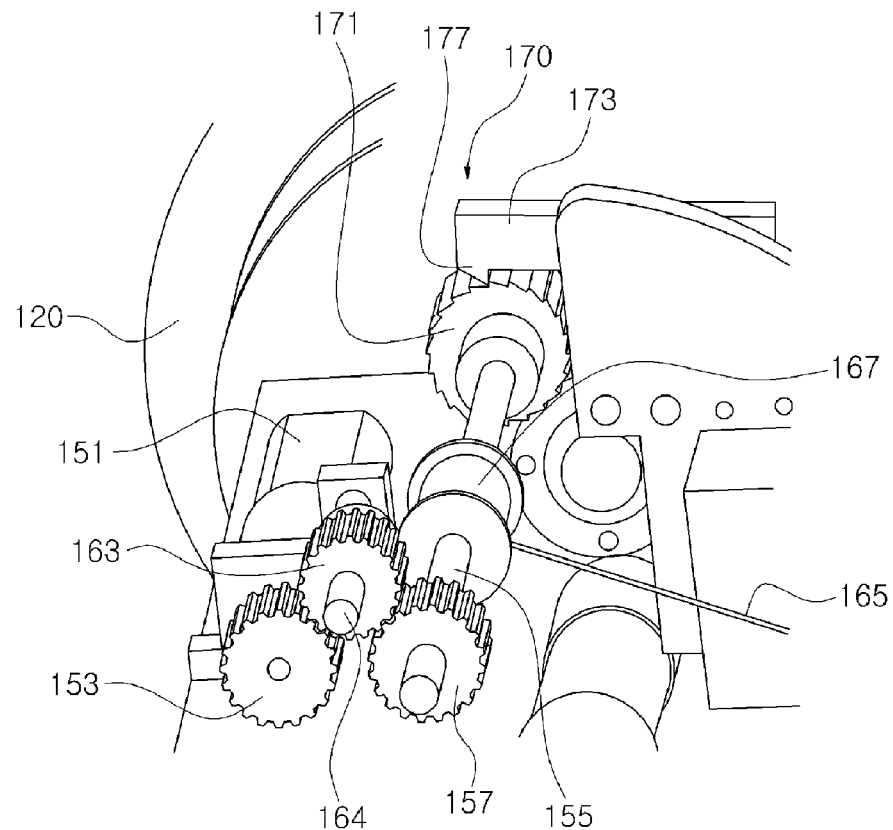
[Fig. 6]
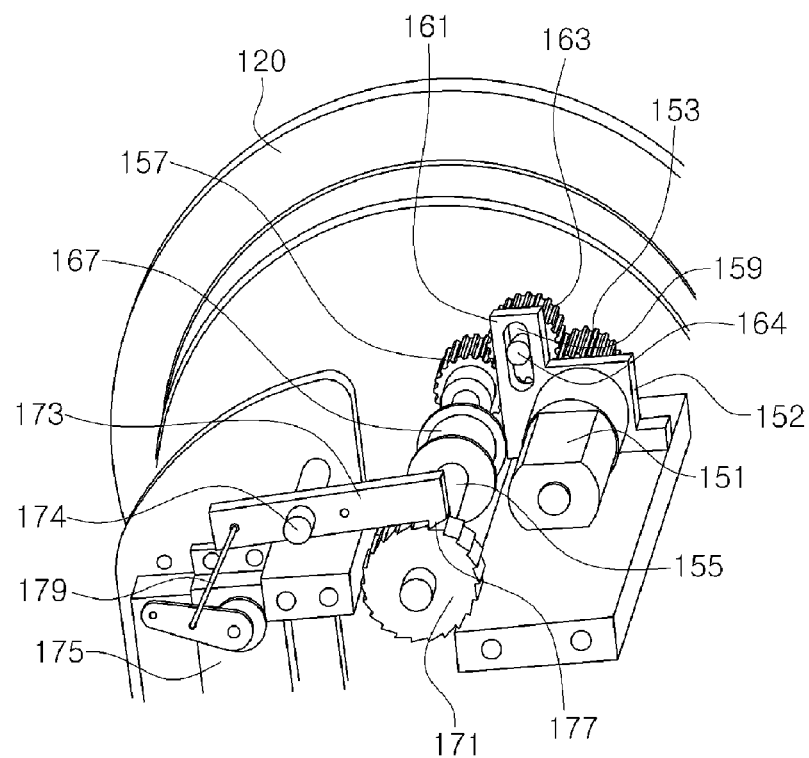

[Fig. 7]
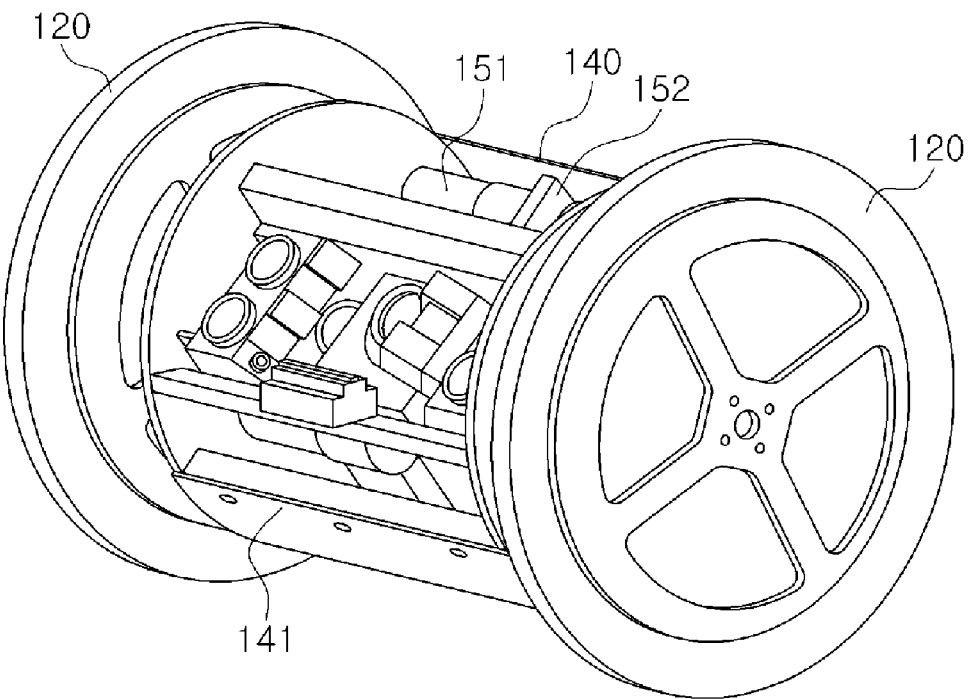
[Fig. 8]
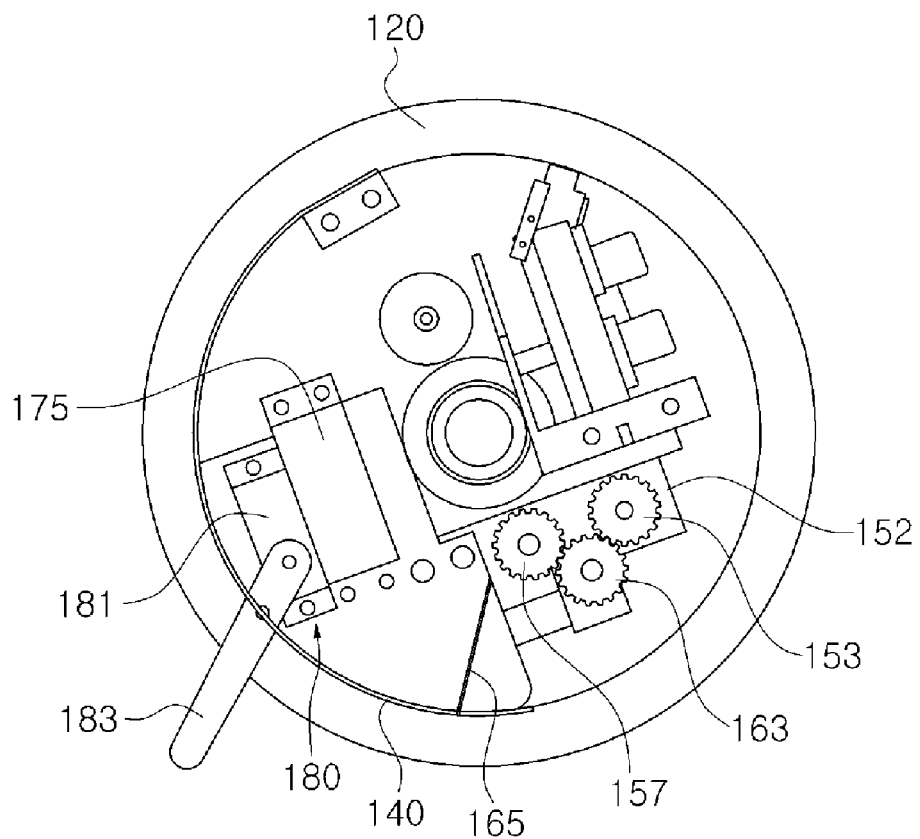

[Fig. 9]
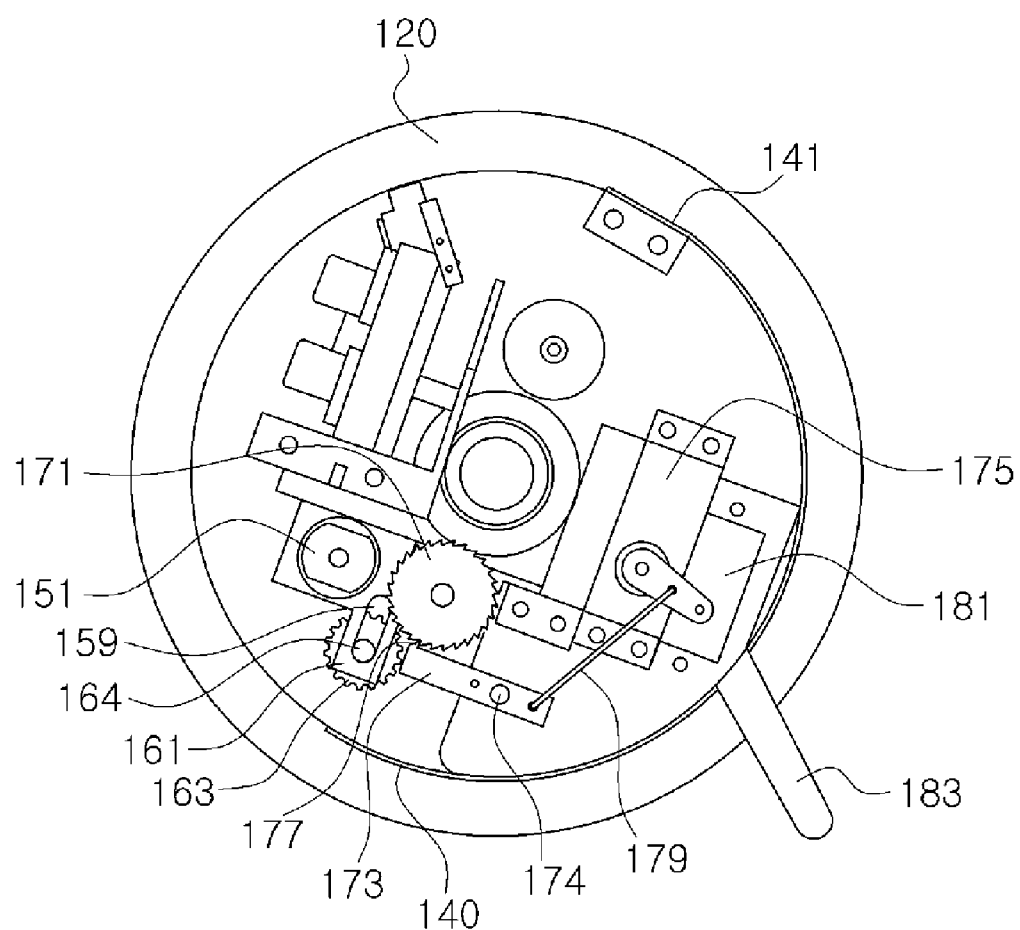

MOBILE ROBOT

TECHNICAL FIELD

The present invention relates to a mobile robot. More particularly, the present invention relates to a mobile robot having a jump function.

BACKGROUND ART

With developments in robot technology, a mobile robot has been introduced, and a mobile robot may be applied in various fields. For example, various robots such as a cleaning robot, a surveillance robot, or other types of robots are developed.

In particular, a robot for performing missions such as guard and scouting has an advantage to be able to be placed in poor surroundings where it is difficult for a person to perform guard or scouting mission and to effectively perform various missions there.

A robot should be able to move in various ground conditions having obstacles to perform guard or scouting mission, but there is a problem that the conventional mobile robot cannot effectively move in poor ground conditions. In addition, the conventional mobile robot does not have a jump function, so there is limitation in use of the conventional mobile robot.

DISCLOSURE OF INVENTION

Technical Problem

The present invention has been made in an effort to provide a mobile robot which can move by itself and can jump if necessary.

Technical Solution

An exemplary mobile robot according to an embodiment of the present invention includes a robot body, a pair of wheels, a driving motor, a leaf spring, and a leaf spring control unit. The pair of wheels are connected to the robot body. The driving motor drives the pair of wheels so as to move the robot body. The leaf spring has a fixed end connected to the robot body and a free end disposed to face the fixed end in a state of being apart from the robot body. The leaf spring control unit applies force to bend the leaf spring such that the free end of the leaf spring is pulled toward the robot body and then removes the force applied to the leaf spring such that the leaf spring returns to an original state.

The leaf spring control unit may include: a first motor mounted to the robot body; a first gear connected to the first motor so as to be rotated by the first motor; a rotating shaft rotatably mounted to the robot body; a second gear disposed to be apart from the first gear and fixed to the rotating shaft so as to rotate together with the rotating shaft; a supporting member having a slot vertically elongating; a third gear movably inserted into the slot of the supporting member so as to move along the slot depending on a rotation position of the robot body, thereby selectively engaging the first gear and the second gear; a wire an end of which is fixed to the rotating shaft and the other end of which is fixed to the leaf spring at a portion near the free end; and a clutch mechanism connected to the rotating shaft so as to allow the rotating shaft to rotate in a direction of bending the leaf spring and so as to selectively allow the rotating shaft to rotate in a direction of unbending the leaf spring.

The clutch mechanism may include: a ratchet fixed to the rotating shaft so as to rotate together with the rotating shaft; a stopper connected to the ratchet so as to selectively allow the rotating shaft to rotate in a direction of unbending the leaf spring; and a servomotor driving the stopper such that the stopper allows the rotating shaft to rotate in a direction of unbending the leaf spring.

The mobile robot may further include a rotation position control unit for controlling a rotation position of the robot body in a state that the pair of wheels are stopped.

The rotation position control unit may include: a servomotor mounted to the robot body; and an arm an end of which is fixed to the servomotor and the other end of which is formed to be rotated by operation of the servomotor so as to be protruded from the robot body.

A slot may be formed in the leaf spring and the arm of the rotation position control unit is inserted into the slot.

Advantageous Effects

According to the present invention, the leaf spring is provided to the robot body of the mobile robot and the leaf spring control unit for bending and then unbending the leaf spring is provided, so the mobile robot can jump using the force of restitution of the bent leaf spring.

Further, the leaf spring control unit provides force for bending the leaf spring and at the same time the leaf spring is allowed to return its original position without load by the force of restitution thereof, so the mobile robot can jump using the force generated by allowing the leaf spring to push the ground.

Still further, with the help of the clutch mechanism which selectively allows the bent leaf spring to return to its original position, jump function can be more effectively realized.

In addition, the rotation position control unit for rotating the inverted robot body in a state that the leaf spring is bent is provided, so direction of jump of the mobile robot can be controlled.

BRIEF DESCRIPTION OF THE DRAWINGS

FIG. 3 is a front view of a mobile robot according to an embodiment of the present invention.

FIG. 4 is a top plan view of a mobile robot according to an embodiment of the present invention.

FIG. 5 and FIG. 6 are drawings showing operations of a leaf spring control unit of a mobile robot according to an embodiment of the present invention.

FIG. 7 to FIG. 9 are drawings sequentially showing jump processes of a mobile robot according to an embodiment of the present invention.

EXPLANATIONS TO REFERENCE NUMERALS FOR THE PRIMARY PARTS OF THE DRAWINGS

Figure 1:
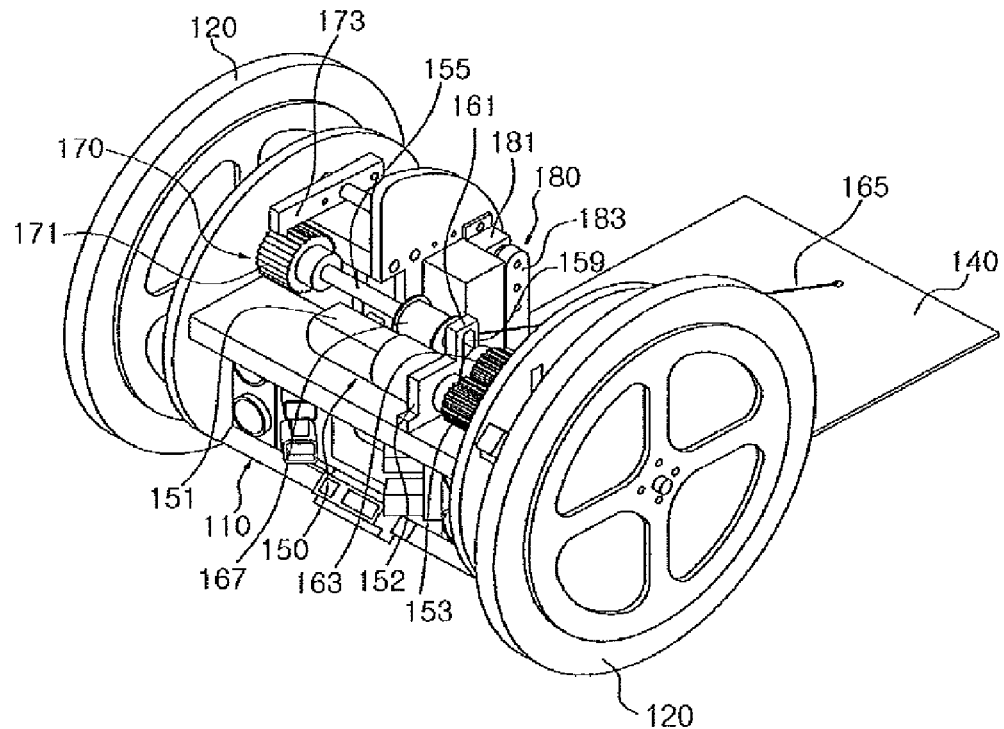
FIG. 1 is a perspective view of a mobile robot according to an embodiment of the present invention.

110: robot body,
120: wheel
130: driving motor,
140: leaf spring
150: leaf spring control unit,
151: motor
153: motor gear,
155: rotating shaft 157: rotating shaft gear,
163: intermediate gear
170: clutch mechanism,
171: ratchet
173: stopper,
175: servomotor
180: rotation position control unit,
181: servomotor
183: arm

BEST MODE FOR CARRYING OUT THE
INVENTION

Hereinafter, embodiments of the present invention will be explained with reference to the drawings.

Figure 2:
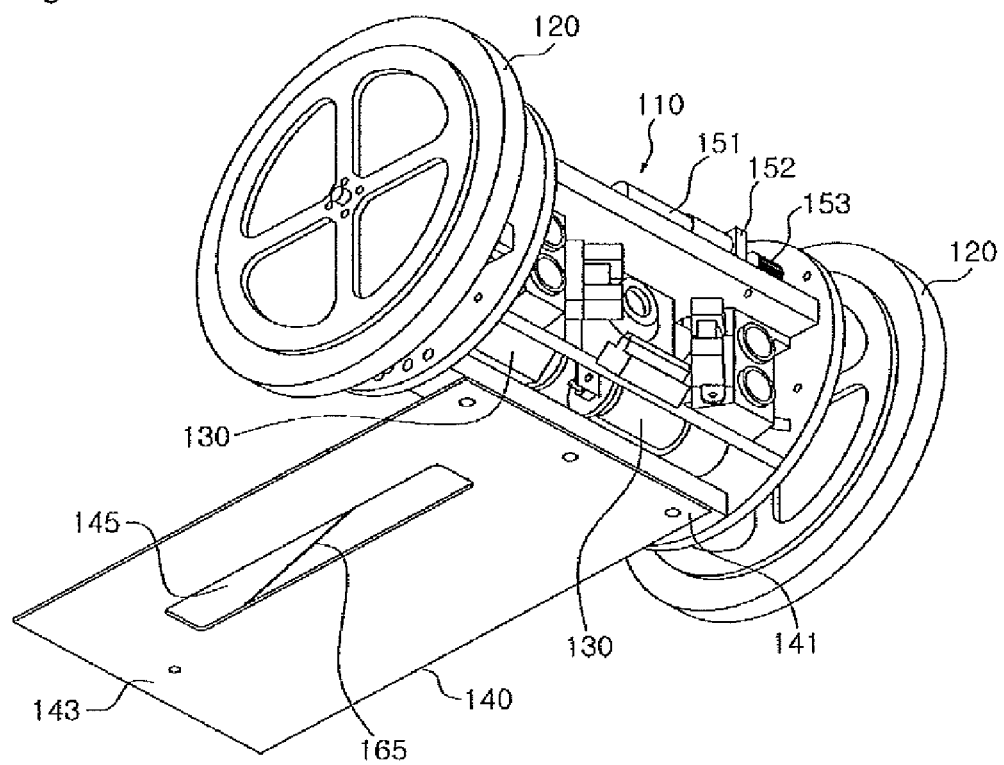
FIG. 2 is a bottom perspective view of a mobile robot according to an embodiment of the present invention.

FIG. 1 is a perspective view of a mobile robot according to an embodiment of the present invention, FIG. 2 is a bottom perspective view of a mobile robot according to an embodiment of the present invention, FIG. 3 is a front view of a mobile robot according to an embodiment of the present invention, and FIG. 4 is a top plan view of a mobile robot according to an embodiment of the present invention.

Referring to FIG. 1 to FIG. 4, a mobile robot according to an embodiment of the present invention includes a robot body 110. The robot body 110 serves as a frame to which various elements of a mobile robot are mounted and may be formed as a plurality of supporting plates and supporting structures.

A pair of wheels 120 are rotatably connected to the robot body 110. For example, as shown in the drawing, the wheels 120 are connected to both sides of the robot body 110 to face each other. The mobile robot may move by rotation of the wheels 120. For example, the pair of wheels 120 may include a part which is formed of material such as sponge which can dampen impact so as to decrease impact caused by collision with outside objects.

A driving motor 130 drives the pair of wheels 120. The pair of wheels 120 are driven by the driving motor 130 so that the robot body 110 can move.

The driving motor 130 may be mounted to the robot body 110. At this time, the driving motor 130 may be provided as a pair which drive the pair of wheels 120 respectively. Although not shown in the drawing, the driving motor 130 may be connected to the pair of wheels 120 by a power transmission device such as a gear, and power of the driving motor 130 may be transmitted to the pair of wheels 120 via the power transmission device.

A leaf spring 140 is coupled to the robot body 110. As shown in FIG. 2, the leaf spring 140 includes a fixed end 141 which is fixed to the robot body 110 and a free end 143 which is opposed to the fixed end 141. The free end 143 is disposed to face the fixed end 141 in a state of being apart from the robot body 110. That is, the leaf spring 140 may have a shape of a rectangle and one end thereof is fixed to the robot body 110.

A leaf spring control unit 150 applies force to the leaf spring 140 so as to bend the leaf spring 140 and then removes the applied force from the leaf spring 140 so that the leaf spring 140 returns to its original state (i.e., the spread state). That is, the leaf spring control unit 150 applies force for bending the leaf spring 140 such that the free end 143 of the leaf spring 140 is pulled toward the robot body 110 and then removes the applied force such that the leaf spring 140 returns to its original state.

The structure and operation of the leaf spring control unit 150 will be explained in more detail with reference to the drawings hereinafter.

The leaf spring control unit 150 includes a first motor (hereinafter referred to as a motor) 151 which is mounted to the robot body 110. For example, the motor 151 may be mounted to a structure forming the robot body 110 by a mounting plate 152.

A first gear (hereinafter referred to as a motor gear) 153 is connected to a rotating shaft of the motor 151 so as to be rotatable by the motor 151.

A rotating shaft 155 is rotatably connected to the robot body 110. For example, the rotating shaft 155 is rotatably connected to a mounting plate which is connected to a structure forming the robot body 110. As shown in the drawing, the rotating shaft 155 may be arranged to be parallel with the rotating shaft of the motor 151.

A second gear (hereinafter referred to a rotating shaft gear) 157 is coupled to the rotating shaft 155 so as to rotate together with the rotating shaft 155. The rotating shaft gear 157 is disposed in the vicinity of the motor gear 153 to be apart from the motor gear 153.

A supporting member 161 having a slot 159 which vertically elongates is provided. The supporting member 161 is mounted to the robot body 110.

A third gear (hereinafter referred to as an intermediate gear) 163 is fitted into the slot 159 of the supporting member 161. That is, a rotating shaft 164 of the intermediate gear 163 is rotatably inserted into the slot 159. At this time, the rotating shaft 164 of the intermediate gear 163 is inserted into the slot 159 so as to be movable in a longitudinal direction of the slot 159. Accordingly, the intermediate gear 163 moves along the slot 159 of the supporting member 161 depending on the rotation position of the robot body 110. That is, the rotation position of the intermediate gear 163 varies depending on the rotation position of the robot body 110, and the intermediate gear 163 moves along the slot 159 by gravitational force depending on the rotation position thereof.

At this time, the intermediate gear 163 is formed to be able to selectively engage the motor gear 153 to the rotating shaft gear 157. That is, in case that the robot body 110 is positioned in a state shown in FIG. 5, the intermediate gear 163 is engaged with both the motor gear 153 and the rotating shaft gear 157, and in case that the robot body 110 is inverted from the state shown in FIG. 5, the intermediate gear 163 is disengaged from both the motor gear 153 and the rotating shaft gear 157.

A wire 165 connecting the rotating shaft 155 and the leaf spring 140 is provided. An end of the wire 165 is fixed to the rotating shaft 155, and the other end thereof is fixed to the leaf spring 140 at a portion near the free end 143. For example, a pulley 167 is provided to the rotating shaft 155, and the wire 165 may be fixed to the pulley 167. Accordingly, if the rotating shaft 155 rotates, the wire 165 is wound up around the pulley 167, and thereby the leaf spring 140 is bent such that the free end 143 of the leaf spring 140 approaches the robot body 110.

A clutch mechanism 170 is connected to the rotating shaft 155. The clutch mechanism 170 allows the rotating shaft 155 to rotate in a direction of bending the leaf spring 140 and selectively allows the rotating shaft 155 to rotate in a direction of unbending the leaf spring 140. That is, the clutch mechanism 170 always allows the rotating shaft 155 to rotate in a clockwise in FIG. 5 (in a counterclockwise in FIG. 6) and selectively allows the rotating shaft 155 to rotate in a counterclockwise in FIG. 5 (in a clockwise in FIG. 6).

The clutch mechanism 170 includes a ratchet 171, a stopper 173, and a servomotor 175.

The ratchet 171 is fixedly coupled to the rotating shaft 155 so as to rotate together with the rotating shaft 155. As shown in the drawing, the ratchet 171 may be disposed opposite to the rotating shaft gear 157.

The stopper 173 is engaged to the ratchet 171 and selectively allows the rotating shaft 155 to rotate in a direction of unbending the leaf spring 140. The stopper 173 is rotatably connected to a connecting shaft 174 which is fixed to the robot body 110, and a protrusion 177 which is engaged with the gear of the ratchet 171 is formed at an end of the stopper 173. At this time, the protrusion 177 is formed to always allow the ratchet 171 to rotate in a direction of bending the leaf spring 140 (in a counter-clockwise in FIG. 6), and in case that the protrusion 177 is engaged with the ratchet 171, the ratchet 171 is prevented from rotating in a direction of unbending the leaf spring 140 (in a clockwise in FIG. 6).

The servomotor 175 rotates the stopper 173 so as to allow the rotating shaft 155 to rotate in a direction of unbending the leaf spring 140.

An end of the stopper 173 is connected to the servomotor 175 via a connecting member 179, and the connecting member 179 pulls an end of the stopper 173 by the operation of the servomotor 175 so that the stopper 173 rotates (in a counter-clockwise in FIG. 6). The protrusion 177 of the stopper 173 is disengaged from the ratchet 171 by the rotation of the stopper 173 by the servomotor 175, and accordingly, the ratchet 171 can rotate in a direction of unbending the leaf spring 140.

Meanwhile, the mobile robot according to an embodiment of the present invention may further include a rotation position control unit 180 for controlling a rotation position of the robot body 110 in a state that the pair of wheels 120 connected to the robot body 110 are stopped.

The rotation position control unit 180 may include a servomotor 181 and an arm 183.

The servomotor 181 is mounted to the robot body 110, and the arm 183 is connected to the servomotor 181 so as to be rotatable by the servomotor 181.

A slot 145 may be formed in the leaf spring 140 for installation and operation of the arm 183 of the rotation position control unit 180. The arm 183 rotates in a state of being inserted into the slot 145.

An end of the arm 183 of the rotation position control unit 180 is coupled to the servomotor 181, and the other end thereof is formed to be able to be protruded from the robot body 110 by the operation of the servomotor 181. That is, the arm 183 is rotated by the operation of the servomotor 181 so as to push the ground. The robot body 110 is rotated by the force of the arm 183 pushing the ground. Accordingly, by controlling the rotation angle of the servomotor 181, the rotation position of the robot body 110 can be regulated. That is, as the arm 183 rotates in a counterclockwise in FIG. 8, the robot body 110 further rotates in a counterclockwise.

Meanwhile, the mobile robot according to an embodiment of the present invention may include various sensors for performing various missions such as a scout mission and an obstacle detection mission. For example, the mobile robot may include a supersonic sensor, a PSD (Position Sensitive Detector) sensor, an infrared ray sensor, or the like, and such sensors can be mounted to suitable positions as required.

In addition, the mobile robot according to an embodiment of the present invention may include a controller for controlling the above-mentioned various motors. The controller may include a microprocessor, a memory, and related hardware and software, and is formed to communicate with the above-mentioned sensors and to control the above-mentioned motors as will be appreciated by one of ordinary skill in the art. For example, the microprocessor is activated by a predetermined program which is programmed to perform various functions such as moving, avoiding obstacles, jumping based on signals of various sensors, and various data for the same are stored in the memory.

Moving and jumping functions of the mobile robot according to an embodiment of the present invention will be explained hereinafter.

First, the pair of wheels 120 rotate by the operation of the driving motor 130, and thereby the mobile robot moves. At this time, if the respective wheels 120 are driven by the separate driving motors 130 respectively, the moving direction of the mobile robot can be controlled.

Meanwhile, if it is needed to overcome obstacles or to jump on a higher position, the mobile robot jumps by the operation of the leaf spring control unit 150.

In case that it is necessary to jump, referring to FIG. 5 and FIG. 6, the motor 151 operates to rotate the motor gear 153, and the rotating force of the motor gear 153 is transmitted to the rotating shaft gear 157 via the intermediate gear 163. Accordingly, the rotating shaft 155 rotates, and the wire 165 is wound up around the pulley 167 of the rotating shaft 155. If the wire 165 is wound up, the free end 143 of the leaf spring 140 is pulled toward the robot body 110, and accordingly the leaf spring 140 is bent toward the robot body 110.

If the leaf spring 140 is bent toward the robot body 110, the center of gravity of the mobile robot moves to the rear side where the leaf spring 140 is located, and if the driving motor 130 is instantaneously operated in this state, the robot body 110 of the mobile robot rotates (in a clockwise in FIG. 7). Accordingly, the robot body 110 rotates to the state as shown in FIG. 8, and at this time, the free end 143 of the leaf spring 140 faces the ground. In this state, if the servomotor 181 of the rotation position control unit 180 is operated so as to rotate the arm 183, the robot body 110 may be further rotated.

While the robot body 110 is being inverted as described above, the intermediate gear 163 moves (in a downward direction in FIG. 8) by the gravitational force, and accordingly, the motor gear 153 and the rotating shaft gear 157 are disengaged from one another. Accordingly, the rotating shaft 155 can rotate without load.

If the servomotor 175 of the clutch mechanism 170 operates in this state so that the stopper 173 rotates in a counter-clockwise in FIG. 9, the ratchet 171 escapes from the restriction of the stopper 173. Accordingly, the bent leaf spring 140 is unbent by the force of restitution so as to instantaneously return to its original position (unbending state). At this time, the free end 143 of the leaf spring 140 pushes the ground, and the mobile robot jumps using the force generated by allowing the leaf spring 140 to push the ground.

At this time, the rotation angle of the arm 183 of the rotation position control unit 180 is controlled so that the rotation position of the robot body 110 can be controlled, and accordingly the direction of the force acting while the leaf spring 140 is unbent can be varied. The direction of jumping of the mobile robot can be controlled using this.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention is applicable to a mobile robot having jump function.

The invention claimed is:

1. A mobile robot, comprising:
a robot body;
a pair of wheels connected to the robot body;
a driving motor driving the pair of wheels so as to move the robot body;
a leaf spring having a fixed end connected to the robot body and a free end disposed to face the fixed end in a state of being apart from the robot body; and
a leaf spring control unit applying force to bend the leaf spring such that the free end of the leaf spring is pulled toward the robot body and then removing the force applied to the leaf spring such that the leaf spring returns to an original state, the leaf spring control unit comprising:
a first motor mounted to the robot body;
a first gear connected to the first motor so as to be rotated by the first motor;
a rotating shaft rotatably mounted to the robot body;
a second gear disposed to be apart from the first gear and fixed to the rotating shaft so as to rotate together with the rotating shaft;
a supporting member having a vertically-elongating slot;
a third gear movably inserted into the slot of the supporting member so as to move along the slot depending on a rotation position of the robot body, thereby selectively engaging the first gear and the second gear;
a wire, an end of which is fixed to the rotating shaft and the other end of which is fixed to the leaf spring at a portion near the free end; and
a clutch mechanism connected to the rotating shaft so as to allow the rotating shaft to rotate in a direction of bending the leaf spring and so as to selectively allow the rotating shaft to rotate in a direction of unbending the leaf spring.

2. The mobile robot of claim 1, wherein the clutch mechanism comprises:
a ratchet fixed to the rotating shaft so as to rotate together with the rotating shaft;
a stopper connected to the ratchet so as to selectively allow the rotating shaft to rotate in the direction of unbending the leaf spring; and
a servomotor driving the stopper such that the stopper allows the rotating shaft to rotate in the direction of unbending the leaf spring.

3. The mobile robot of claim 1, further comprising a rotation position control unit for controlling a rotation position of the robot body in a state that the pair of wheels are stopped.

4. A mobile robot, comprising:
a robot body;
a pair of wheels connected to the robot body;
a driving motor driving the pair of wheels so as to move the robot body;
a leaf spring having a fixed end connected to the robot body and a free end disposed to face the fixed end in a state of being apart from the robot body;
a leaf spring control unit applying force to bend the leaf spring such that the free end of the leaf spring is pulled toward the robot body and then removing the force applied to the leaf spring such that the leaf spring returns to an original state; and
a rotation position control unit for controlling a rotation position of the robot body in a state that the pair of wheels are stopped, the rotation position control unit comprising:
a servomotor mounted to the robot body; and
an arm, an end of which is fixed to the servomotor and the other end of which is formed to be rotated by operation of the servomotor so as to be protruded from the robot body.

5. The mobile robot of claim 4, wherein a slot is formed in the leaf spring and the arm of the rotation position control unit is inserted into the slot.

* * * * *